April 6, 1948.  C. V. LITTON  2,438,931
VARIABLE CONDENSER
Filed March 15, 1944
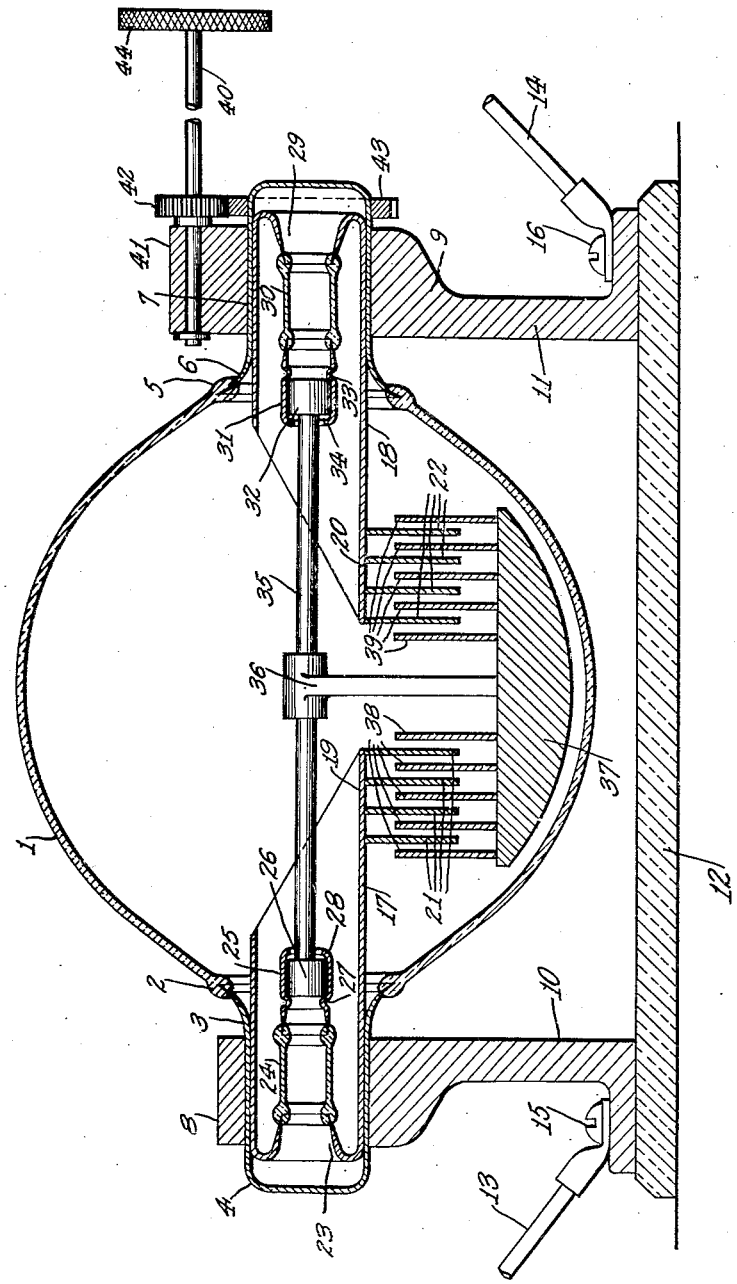
INVENTOR.
CHARLES V. LITTON
BY
Robert Harding Jr.
ATTORNEY Patented Apr. 6, 1948

2,438,931

UNITED STATES PATENT OFFICE 2,438,931

VARIABLE CONDENSER

Charles V. Litton, Redwood City, Calif., assignor to Federal Telephone and Radio Corporation, New York, N. Y., a corporation of Delaware Application March 15, 1944, Serial No. 526,526

6 Claims. (Cl. 175—41.5)

This invention relates to variable condensers and particularly to such condensers arranged to be operated in an atmosphere of reduced pressure.

One of the objects of the invention is to provide a vacuum condenser, the capacity of which may be varied by rotating the envelope thereof.

Another object of the invention is to provide a vacuum variable condenser which is easy to construct and which may be easily and accurately adjusted.

Other objects of the invention will be apparent as the description thereof proceeds.

One embodiment of the invention is illustrated in the accompanying drawing in which the single figure is a sectional side elevational view of the condenser, showing the manner of mounting the rotating parts.

The condenser of the invention is enclosed in an envelope 1 which may be of glass or other suitable insulating material and which may be globular in form. The envelope 1 is provided with openings at opposite ends, concentric with a horizontal axis about which the envelope is adapted to be rotated for tuning the condenser. The rim of the opening on one end is fused, as at 2, upon the flared edge 3 of a metal sleeve 4. The other opening in the envelope 1 has its rim fused, as at 5, to the flared edge 6 of a metal sleeve 7. The sleeves 4 and 7 are in alignment with the rotating axis and are rotatably mounted in bearings 8 and 9, respectively, these bearings being supported on suitable pedestals 10 and 11 which, in turn, may be supported upon an insulating base 12. The outside electrical connections to the condenser are made through the bearings 8 and 9 by the wires 13 and 14, respectively, which are connected to the bearings by suitable means, such as the screws 15, shown attaching the pedestals 10 and 11 to the base 12.

Inside of the sleeve 4 I provide another sleeve 17 which has a close fit with the sleeve 4 and is welded to it or is in such close contact therewith as to provide a good electrical connection between the two sleeves and prevent relative movement therebetween. Similarly a sleeve 18 is provided within the sleeve 7. The sleeves 17 and 18 are cut diagonally within the envelope 1 so as to form extended portions 19 and 20 the ends of which are spaced a short distance from each other adjacent the center of the envelope 1.

A plurality of rotor plates 21 are attached to the portion 19 of the sleeve 17 and extend outwardly therefrom perpendicular to the rotating axis. Similarly, a plurality of rotor plates 22 are attached to the portion 20 of the sleeve 18 and extend outwardly therefrom perpendicular to the axis of the condenser. The two sets of rotor plates 21 and 22 are aligned, and all rotate when the envelope 1 is rotated. The rotor plates 21 are electrically connected to the wire 13 through the sleeves 17 and 4 and the bearing 8. Similarly the rotor plates 22 are electrically connected to the wire 14 through the sleeves 18 and 7 and the bearing 9.

The outer end of the sleeve 17 is turned inwardly to form a smaller diameter sleeve 23 to the end of which is fused a short tube 24 of insulating material, such as glass. The other end of the tube 24 is fused to the outer end of a short metal tube 25 which forms a bearing for a cylinder 26 which is preferably made of a material having a low friction characteristic, such as graphite. A groove 27 may be provided in the tube 25 to limit movement of the cylinder 26 towards the sleeve 24, and the inner end of the sleeve 25 may be spun over, as at 28, to limit the movement of the cylinder 26 in the other direction.

The outer end of the sleeve 18 is likewise turned inwardly upon itself to form a sleeve 29 to the end of which is fused an insulating sleeve 30 of glass or other suitable material. A metal sleeve 31 is fused to the inner end of the sleeve 30 and forms a bearing for a cylinder 32 which is similar to the cylinder 26. The sleeve 31 may be provided with a groove 33 to prevent outward movement of the sleeve 32 and the inner end may be spun over, as at 34, to prevent movement of the sleeve 32 in the other direction.

A shaft 35 is mounted between the two cylinders 26 and 32 and concentrically therewith, the cylinders being preferably molded to the ends of the shaft. The shaft is preferably made of steel or other material having low electrical conductivity. Thus constructed, the shaft 35 is rotatably mounted within the sleeves 17 and 18 and insulated therefrom by the insulating sleeves 24 and 30. The cylinders 26 and 32, being preferably made of graphite, will have very little friction with the sleeves 25 and 31, so that the shaft 35 may rotate very freely.

At the center of the shaft 35 I provide an arm 36 which may be rigidly attached to the shaft in any desired manner and which carries on its outer end a weighted member 37. The outer surface of the member 37 is shaped to conform to the inner surface of the envelope 1 and is spaced from that envelope, so that the shaft 35 can be continuously rotated. Upon the inner surface of the member 37 are mounted a plurality of condenser plates 38 and 39, arranged in two groups, the group 38 cooperating capacitively with the rotor plates 21, attached to the sleeve 17, and the plates 39 cooperating capacitively with the rotor plates 22, attached to the sleeve 18. The member 37 is long enough axially so that the groups of plates 38 and 39 may be properly spaced to cooperate with the rotor plates 21 and 22. The member 37 also has sufficient weight so that it will tend to remain at its lowermost point, as indicated in the figure, regardless of how the envelope 1 is rotated in its bearings.

The arrangement forms in effect a dual-section condenser with two separate condensers in series, the one consisting of the rotor plates 21 and the stator plates 38 and the other consisting of the stator plates 39 and the rotor plates 22. It will be seen that if the envelope 1 is now rotated, the plates 21 and 22 will turn out of cooperative relation with the plates 38 and 39 and will move into the upper portion of the envelope 1, and, as they move, the capacity of the condenser will be decreased, until the minimum capacity is obtained when the plates are at their uppermost position. In the position shown in the figure, the condenser has its maximum capacity.

Any suitable arrangement for rotating the envelope 1 in its bearings may be provided, as, for instance, the shaft 40 which is shown rotatably mounted in an extended portion 41 of the bearing 9 and is provided with a spur gear 42 which meshes with a gear 43 attached to the sleeve 7. Rotation of the shaft 40 by means of a suitable handwheel 44, for instance, will cause the entire envelope 1 to rotate in its bearings 8 and 9 through the gears 42 and 43.

The envelope 1 may be exhausted of air or the air may be greatly reduced in pressure through any suitable opening provided for that purpose, as will be understood, or the envelope may be filled with an inert gas, if so desired.

By the arrangement shown the stator plates 38 and 39 may be very accurately positioned with respect to the plates 21 and 22, and by means of the graphite cylinders 26 and 32, are arranged to turn very easily with respect to the rotor plates. Hence any rotational movement of the envelope 1 will change the capacity of the condenser without causing the stator plates to move with respect to the base 12, the weighted member 37 holding them in substantially fixed position at the lowermost portion of the envelope.

Various modifications of the invention will suggest themselves to those skilled in the art, and I do not desire therefore to limit myself to the structure shown and described except by the limitations included in the appended claims.

What is claimed is:

1. A variable condenser comprising a first fixed bearing, a second fixed bearing in alignment with said first bearing, a first metallic sleeve rotatably mounted in said first fixed bearing, said sleeve being closed at the end away from said second bearing, a second metallic sleeve rotatably mounted in said second bearing, said second sleeve being closed at the end away from said first bearing, an envelope of insulating material mounted between said sleeves and forming with said sleeves a unitary structure which is rotatable in said bearings, a first group of rotor plates attached to said first sleeve within said envelope, a second group of rotor plates attached to said second sleeve within said envelope, a group of stator plates adapted for capacitive cooperation with said groups of rotor plates, means to mount said stator plates rotatably within said first and second metallic sleeves, means to insulate said stator plates from said sleeves, and a weighted member attached to said stator plates and adapted to maintain said stator plates in substantially fixed position by gravity when said sleeves are rotated.

2. A variable condenser as defined in claim 1, in which the envelope and first and second sleeves form a gas tight unit from which the air has been partly exhausted.

3. A variable condenser comprising an envelope of insulating material, symmetrical about a horizontal axis, said envelope having a pair of opposed openings concentric with said axis, a metallic sleeve in each of said openings forming a gas tight connection with said envelope, said sleeves being closed at their outer ends so that said envelope is gas tight, two groups of electrically connected rotor plates within said envelope, one supported from each of said sleeves, a group of stator plates arranged to cooperate with said groups of rotor plates, said stator plates being electrically connected together, means to mount said stator plates rotatably with respect to said sleeves, means to insulate said stator plates from said sleeves, weighted means attached to said stator plates, so as to maintain them by gravity in substantially fixed position within said envelope regardless of the rotation thereof about said axis, and an atmosphere of reduced pressure within said envelope.

4. A variable condenser comprising an envelope of insulating material, symmetrical about a horizontal axis, said envelope having a pair of opposed openings concentric with said axis, a metallic sleeve in each of said openings forming a gas tight connection with said envelope, said sleeves being closed at their outer ends so that said envelope is gas tight, a metallic supporting member within each of said sleeves, a group of rotor plates supported within said envelope on each of said supporting members, said rotor plates being mounted perpendicularly to said axis, a bearing member insulatedly supported upon each of said supporting members within said sleeves, a cylinder of graphite rotatably supported within each of said bearing members, a shaft supported by said graphite cylinders and concentric therewith, a group of stator plates mounted perpendicularly to said axis and arranged to cooperate with each group of rotor plates, means for electrically connecting said stator plates together and for mounting said stator plates upon said shaft, weighted means for causing said stator plates to remain by gravity in substantially fixed position regardless of the rotation of said envelope, and an atmosphere of reduced pressure within said envelope.

5. A variable condenser comprising an envelope of insulating material, symmetrical about a horizontal axis, said envelope having a pair of opposed openings concentric with said axis, a first metallic sleeve in each of said openings forming a gas tight connection with said envelope, said sleeves being closed at their outer ends so that said envelope is gas tight, a second sleeve rigidly attached within each of said first sleeves, said second sleeve having a portion extending in towards the center of said envelope and the outer end of said sleeve being turned inwardly, a tube of insulating material mounted upon each turned-in portion of said second sleeves substantially concentric with said axis, a bearing member mounted upon the inner end of each of said tubes, a graphite cylinder rotatably mounted in each of said bearing members, a shaft connecting said graphite cylinders and supported thereby, a group of rotor plates attached to the inwardly extending portion of each of said second sleeves, a group of stator plates mounted to cooperate with each of said groups of rotor plates, means to support said stator plates from said shaft and electrically connect them together, weighted means to maintain said stator plates in substantially fixed position regardless of the rotation of said rotor plates, an atmosphere of reduced pressure within said envelope means for rotatably supporting said first sleeves, and means to rotate said first sleeves in said supporting means.

6. A variable condenser comprising a first fixed bearing, a second fixed bearing in alignment with said first bearing, a first metallic sleeve rotatably mounted in said first fixed bearing, a second metallic sleeve rotatably mounted in said second bearing, an envelope of insulating material mounted between said sleeves and forming with said sleeves a unitary structure which is rotatable in said bearings, a first group of rotor plates attached to said first sleeve within said envelope, a second group of rotor plates attached to said second sleeve within said envelope, a group of stator plates adapted for capacitive cooperation with said groups of rotor plates, means to mount said stator plates rotatably within said first and second metallic sleeves, and a weighted member attached to said stator plates and adapted to maintain said stator plates in substantially fixed position by gravity when said sleeves are rotated.

CHARLES V. LITTON.

REFERENCES CITED

The following references are of record in the file of this patent:

UNITED STATES PATENTS

| Number | Name | Date |
| --- | --- | --- |
| 1,576,829 | Johnson | Mar. 16, 1926 |
| 1,592,775 | Lissen | July 13, 1926 |
| 1,608,472 | Aurynger | Nov. 23, 1926 |
| 1,452,610 | Klosner | Apr. 24, 1923 |
| 1,641,945 | Murray | Sept. 6, 1927 |